United States Patent
Wada (10) Patent No.: US 10,071,334 B2
(45) Date of Patent: Sep. 11, 2018

(54) FILTER MEDIUM AND FILTER UNIT

(71) Applicant: NITTO DENKO CORPORATION, Osaka (JP)

(72) Inventor: Shiho Wada, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 15/567,678

(22) PCT Filed: May 2, 2016

(86) PCT No.: PCT/JP2016/002245
§ 371 (c)(1),
(2) Date: Oct. 19, 2017

(87) PCT Pub. No.: WO2016/178323
PCT Pub. Date: Nov. 10, 2016

(65) Prior Publication Data
US 2018/0147522 A1    May 31, 2018

(30) Foreign Application Priority Data
May 7, 2015  (JP) ................................ 2015-095108

(51) Int. Cl.
*B01D 53/22*    (2006.01)
*B01D 46/52*    (2006.01)
(Continued)

(52) U.S. Cl.
CPC .............. *B01D 46/521* (2013.01); *A47L 9/12* (2013.01); *B01D 63/14* (2013.01); *B01D 71/36* (2013.01); *B01D 2201/12* (2013.01)

(58) Field of Classification Search
CPC ........ B01D 71/36; B01D 63/14; B01D 46/521; B01D 2201/12; B01D 53/22; A47L 9/12
See application file for complete search history.

(56) References Cited

U.S. PATENT DOCUMENTS 5,989,432 A      11/1999   Gildersleeve et al.
9,314,736 B2 *   4/2016    Itou ..................... B01D 53/228
(Continued)

FOREIGN PATENT DOCUMENTS

CN    102958694 A    3/2013
JP    8-243359 A     9/1996
(Continued)

OTHER PUBLICATIONS

Decision to Grant a Patent for Japanese Application 2016-092709 dated Aug. 1, 2017, including allowed claims, and a certified translation thereof.
(Continued)

*Primary Examiner* — Anthony R Shumate
(74) *Attorney, Agent, or Firm* — Greenblum & Bernstein, P.L.C.

(57) ABSTRACT

A filter medium includes a first porous polytetrafluoroethylene membrane, a first air-permeable support member, a second porous polytetrafluoroethylene membrane, and a second air-permeable support member. A surface of the filter medium is formed by the first porous polytetrafluoroethylene membrane. A bond strength, as measured by a 180° peel test, between the first porous polytetrafluoroethylene membrane and the first air-permeable support member is higher than 1.2 N/25 mm and higher than a bond strength, as measured by the 180° peel test, between the first air-permeable support member and the second porous polytetrafluoroethylene membrane.

8 Claims, 8 Drawing Sheets

(51) Int. Cl.
*A47L 9/12* (2006.01)
*B01D 71/36* (2006.01)
*B01D 63/14* (2006.01)

(56) References Cited

U.S. PATENT DOCUMENTS

| | | | |
|---|---|---|---|
| 9,908,088 B2* | 3/2018 | Jerman | B29C 66/1122 |
| 2002/0170434 A1 | 11/2002 | Kawano et al. | |
| 2010/0006497 A1* | 1/2010 | Thottupurathu | B01D 67/0027 |
| | | | 210/505 |
| 2010/0269464 A1 | 10/2010 | Mori et al. | |
| 2010/0280200 A1* | 11/2010 | Poddar | B01D 67/0088 |
| | | | 526/243 |
| 2010/0283214 A1 | 11/2010 | Hisano et al. | |
| 2013/0101889 A1 | 4/2013 | Mizuno et al. | |
| 2014/0231340 A1* | 8/2014 | Gsell | B01D 67/0027 |
| | | | 210/500.36 |
| 2014/0345462 A1* | 11/2014 | Itou | B01D 69/12 |
| | | | 96/13 |
| 2015/0082984 A1* | 3/2015 | Maruoka | B01D 67/0088 |
| | | | 96/13 |
| 2016/0339394 A1* | 11/2016 | Aburaya | B32B 5/022 |

FOREIGN PATENT DOCUMENTS

| | | |
|---|---|---|
| JP | 2003-190749 A | 7/2003 |
| JP | 2004-243220 A | 9/2004 |
| JP | 2005-246233 A | 9/2005 |
| JP | 2009-73051 A | 4/2009 |
| JP | 2010-142746 A | 7/2010 |
| JP | 2012-228687 A | 11/2012 |
| JP | 2014-30825 A | 2/2014 |
| JP | 2014-195991 A | 10/2014 |
| JP | 2014-208326 A | 11/2014 |
| JP | 2014-226650 A | 12/2014 |

OTHER PUBLICATIONS

International Search Report from Patent Application No. PCT/JP2016/002245, dated Jul. 19, 2016.
Extended European Search Report in respect to European Application No. 16789459.1, dated Jun. 7, 2018.

* cited by examiner

FILTER MEDIUM AND FILTER UNIT

TECHNICAL FIELD

The present invention relates to filter media and filter units.

BACKGROUND ART

Filter media having a porous polytetrafluoroethylene (PTFE) membrane are used in various applications, such as in intake air filters for turbines, air filters for clean rooms, and filters for household electric appliances. Patent Literature 1 discloses a filter medium including one support member and two porous PTFE membranes, the support member being held between the porous PTFE membranes. Patent Literature 2 discloses a filter medium including two support members and one porous PTFE membrane, the porous PTFE membrane being held between the support members. Patent Literature 1 also discloses a filter medium including two porous PTFE membranes and two support members, the porous PTFE membranes and the support members being alternately arranged.

In some cases, a filter medium is required to permit removal of dust from a surface of the filter medium so that the filter medium can be repeatedly used. As stated in Patent Literature 1, dust adhering to a surface of a filter medium can easily be removed when the surface of the filter medium is formed by a porous PTFE membrane.

CITATION LIST

Patent Literature

Patent Literature 1: JP 2005-246233 A
Patent Literature 2: JP 2012-228687 A

SUMMARY OF INVENTION

Technical Problem

To remove dust adhering to a surface of a filter medium, the filter medium may be exposed to a blast of air or may be washed with water. In this case, however, a porous PTFE membrane used in the filter medium may be damaged by a high pressure imposed by an air stream or water stream, since such a porous PTFE membrane is very thin. Specifically, the porous PTFE membrane may be broken or may be separated from a support member. Enhancing the bond strength between the porous PTFE membrane and the support member or increasing the thickness of the porous PTFE membrane improves the durability of the filter medium, but can lead to a significant decrease in air permeability (increase in pressure drop). That is, there is a trade-off relationship between the durability and air permeability.

In view of the above circumstances, the present invention aims to provide a technique by which the durability of a filter medium designed to permit easy removal of dust by cleaning can be improved while avoiding a significant decrease in air permeability. The present invention also aims to provide a filter unit including the filter medium.

Solution to Problem

That is, the present invention provides a filter medium including a first porous PTFE membrane, a first air-permeable support member, a second porous PTFE membrane, and a second air-permeable support member that are stacked in this order and bonded to one another, wherein a surface of the filter medium is formed by the first porous PTFE membrane, and a bond strength, as measured by a 180° peel test, between the first porous PTFE membrane and the first air-permeable support member is higher than 1.2 N/25 mm and higher than a bond strength, as measured by the 180° peel test, between the first air-permeable support member and the second porous PTFE membrane.

In another aspect, the present invention provides a filter unit including:

the filter medium as defined above; and a frame supporting an outer peripheral portion of the filter medium.

Advantageous Effects of Invention

According to the present invention, the durability of a filter medium designed to permit easy removal of dust by cleaning can be improved while avoiding a significant decrease in air permeability.

DESCRIPTION OF EMBODIMENTS

Hereinafter, an embodiment of the present invention will be described with reference to the drawings. The present invention is not limited to the embodiment described below.

Figure 1:
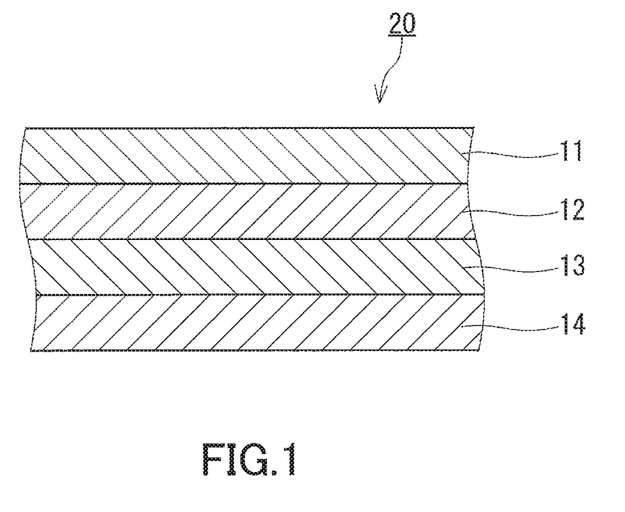
FIG. 1 is a schematic cross-sectional view of a filter medium according to an embodiment of the present invention.

As shown in FIG. 1, a filter medium 20 according to the present embodiment includes a first porous PTFE membrane 11, a first air-permeable support member 12, a second porous PTFE membrane 13, and a second air-permeable support member 14. The first porous PTFE membrane 11, the first air-permeable support member 12, the second porous PTFE membrane 13, and the second air-permeable support member 14 are stacked in this order and are bonded to one another.

In the present embodiment, one surface of the filter medium 20 is formed by the first porous PTFE membrane 11. Porous PTFE membranes generally have a smooth, slippery surface. The configuration of the present embodiment thus makes it possible, when dust is deposited on the surface of the filter medium 20, to easily remove the dust from the surface of the filter medium 20.

In the present embodiment, the filter medium 20 is composed of four layers. The filter medium 20 may alternatively be composed of more than four layers. A filter medium composed of more than four layers can be obtained by alternately stacking porous PTFE membranes and air-permeable support members. To allow easy removal of dust, it is important that at least one surface (main surface) of the filter medium 20 be formed by a porous PTFE membrane. Specifically, the filter medium 20 has a main surface that faces upstream in the flow direction of gas to be filtered and a main surface that faces downstream in the flow direction, and the upstream main surface is formed by the first porous PTFE membrane 11. In the present embodiment, the downstream main surface is formed by the second air-permeable support member 14. The term "main surface" refers to that surface of the filter medium 20 which has the largest area.

The parameters such as thickness, surface density, average pore diameter, and porosity of the first porous PTFE membrane 11 may be equal to those of the second porous PTFE membrane 13. This means that porous PTFE membranes of the same type (porous PTFE membranes produced using the same material under the same conditions) can be used as the first porous PTFE membrane 11 and the second porous PTFE membrane 13. It should be understood that the parameters such as thickness, surface density, average pore diameter, and porosity of the first porous PTFE membrane 11 may be different from those of the second porous PTFE membrane 13.

A porous PTFE membrane that can be used as the first porous PTFE membrane 11 or as the second porous PTFE membrane 13 has an average pore diameter in the range of, for example, 0.01 to 100 μm or 0.01 to 50 μm. The porous PTFE membrane has a thickness, for example, in the range of 1 to 300 μm or 2 to 100 μm.

The porous PTFE membrane can be produced by the following method. First, a fine PTFE powder is mixed with a solvent to prepare a paste. The paste is extruded into the form of a sheet. The resulting PTFE sheet is stretched and sintered, and thus the porous PTFE membrane is obtained. In the stretching (typically biaxial stretching) of the PTFE sheet, the area stretch ratio (a value calculated by multiplying the stretch ratio in one axial direction by the stretch ratio in a direction perpendicular to the one axial direction) is, for example, in the range of 50 to 900. The term "PTFE" as used herein is intended to include "modified PTFE".

The first air-permeable support member 12 and the second air-permeable support member 14 have a sheet shape. The first air-permeable support member 12 and the second air-permeable support member 14 each have higher strength and higher air permeability than, for example, a porous PTFE membrane used as at least one of the first porous PTFE membrane 11 and second porous PTFE membrane 13. As the first air-permeable support member 12 and the second air-permeable support member 14 there can be used woven fabrics, non-woven fabrics, meshes, nets, and foamed materials. Among these, non-woven fabrics are most preferably used. The fibers constituting the non-woven fabric used may be synthetic fibers made of a polymer material such as polyolefin (such as polyethylene and polypropylene), polyester (such as polyethylene terephthalate), polyamide, acrylic, and polyimide. The non-woven fabric may be a composite fabric constituted by a plurality of types of fibers. Non-woven fabrics of the same type (the same product number) or of different types may be used as the first air-permeable support member 12 and the second air-permeable support member 14. The first air-permeable support member 12 and the second air-permeable support member 14 each have a thickness, for example, in the range of 50 to 300 μm.

In the present embodiment, the first porous PTFE membrane 11, the first air-permeable support member 12, the second porous PTFE membrane 13, and the second air-permeable support member 14 are bonded to one another. The method for bonding these components is not particularly limited. These components may be bonded using an adhesive or may be bonded by thermal lamination. When the air-permeable support members 12 and 14 are non-woven fabrics having thermal adhesiveness, thermal lamination is suitable for the present embodiment. With the use of thermal lamination, it is easier to achieve sufficient bond strength between the porous PTFE membranes and the air-permeable support members while preventing a decrease in air permeability.

For example, when a non-woven fabric contains fibers made of a thermoplastic resin such as polyethylene, the non-woven fabric exhibits thermal adhesiveness at relatively low temperatures. When such a non-woven fabric and a porous PTFE membrane are placed on each other and they are subjected to a pressure under heating, part of the fibers of the non-woven fabric are melted and solidified, so that the non-woven fabric is bonded to the porous PTFE membrane. The bonding points are located only on the fibers of the non-woven fabric, and thus regions devoid of fibers can have air permeability.

The non-woven fabric may be an embossed non-woven fabric. The embossed non-woven fabric is a non-woven fabric having one or more recessed portions and one or more projecting portions. The embossed non-woven fabric has higher stiffness and higher strength than an unembossed non-woven fabric as thick as the embossed non-woven fabric. The embossed non-woven fabric has an indented pattern or, in other words, the embossed non-woven fabric has a sea-island structure when viewed in plan. In the embossed non-woven fabric of the type shown in FIG. 2A (T-type), elliptical portions corresponding to "islands" (where the fibers are not melted) are projecting portions, and a portion corresponding to the "sea" (where the fibers are melted) is a recessed portion. The T-type embossed non-woven fabric typically has a single, continuous recessed portion and a plurality of projecting portions. The T-type embossed non-woven fabric may have a plurality of recessed portions separate from each other. In the embossed non-woven fabric of the type shown in FIG. 2B (S-type), circular portions corresponding to "islands" (where the fibers are melted) are recessed portions, and a portion corresponding to the "sea" (where the fibers are not melted) is a projecting portion. The S-type embossed non-woven fabric typically has a plurality of recessed portions and a single, continuous projecting portion. The S-type embossed non-woven fabric may have a plurality of projecting portions separate from each other. With the use of these embossed non-woven fabrics, the locations of the bonding points described above are further limited, so that it is easier to achieve both high air permeability and high bond strength. The S-type embossed non-woven fabric tends to exhibit a higher bond strength to porous PTFE membranes than the T-type embossed non-woven fabric, although this tendency depends on the bonding conditions (the conditions of thermal lamination).

Embossed non-woven fabrics include T-type embossed non-woven fabrics and S-type embossed non-woven fabrics as described with reference to FIG. 2A and FIG. 2B. For the present embodiment, the use of a T-type embossed non-woven fabric (FIG. 2A) is recommended. The T-type embossed non-woven fabric has the advantage of being able to be easily pleated.

Figure 2A:
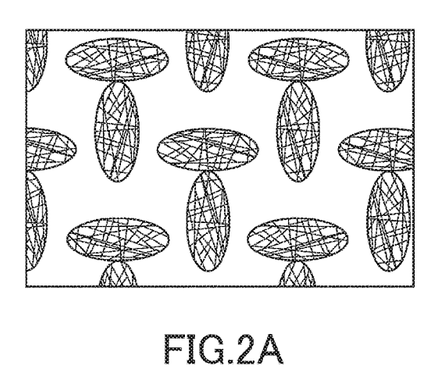
FIG. 2A is a plan view of an embossed non-woven fabric (T-type) suitable for use in the filter medium shown in FIG. 1.
Figure 2B:
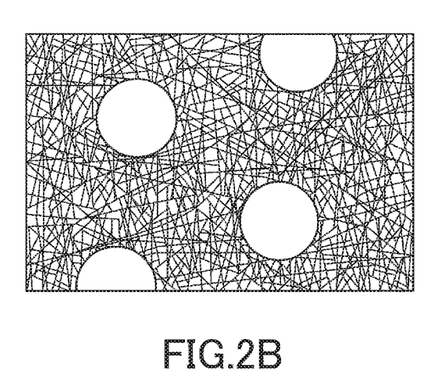
FIG. 2B is a plan view of another embossed non-woven fabric (S-type) suitable for use in the filter medium shown in FIG. 1.
Figure 2C:
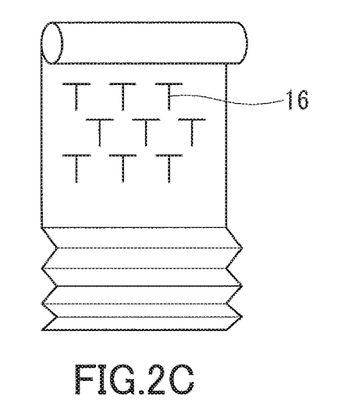
FIG. 2C is a diagram for describing an advantage of a T-type embossed non-woven fabric.

In the T-type embossed non-woven fabric shown in FIG. 2A, the longitudinal direction of a plurality of unembossed portions (the direction of the major axis of each ellipse) coincides with the vertical or horizontal direction. In other words, each pair of the unembossed portions form a T-shape. Thus, the T-type embossed non-woven fabric can easily be pleated when, as shown in FIG. 2C, the pleating is carried out in such a manner that the direction of the pleating folds (the direction of mountain and valley folds) coincides with the longitudinal direction of the unembossed portions 16.

The embossed non-woven fabric is, for example, a double-embossed non-woven fabric having two embossed surfaces. When a double-embossed non-woven fabric is used as the first air-permeable support member 12, the two embossed surfaces of the first air-permeable support member 12 are in contact with the first porous PTFE membrane 11 and the second porous PTFE membrane 13, respectively. When double-embossed non-woven fabrics are used as the first air-permeable support member 12 and the second air-permeable support member 14, the use of the same material can be expected to produce a cost-reducing effect. Additionally, the use of double-embossed non-woven fabrics reduces the occurrence of errors in manufacturing of the filter medium 20, since there is no distinction between the two sides of double-embossed non-woven fabrics.

A single-embossed non-woven fabric having only one embossed surface may be used as the first air-permeable support member 12. A single-embossed non-woven fabric having only one embossed surface may be used as the second air-permeable support member 14.

The filter medium 20 can be placed at a given location (for example, within a vacuum cleaner) in such a manner that dust will be deposited on the surface formed by the first porous PTFE membrane 11. To remove the dust adhering to the surface of the filter medium 20, the filter medium 20 needs to be washed with water, exposed to a blast of air, or rubbed with a brush. In the filter medium 20 of the present embodiment, a bond strength $A_1$, as measured by a 180° peel test, between the first porous PTFE membrane 11 and the first air-permeable support member 12 is higher than 1.2 N/25 mm. When the bond strength $A_1$ between the first porous PTFE membrane 11 and the first air-permeable support member 12 is higher than 1.2 N/25 mm, the filter medium 20 of the present embodiment exhibits sufficient resistance to pressure imposed by a water stream, air stream, or brush.

In the present embodiment, the bond strength $A_1$ between the first porous PTFE membrane 11 and the first air-permeable support member 12 is higher than a bond strength $A_2$, as measured by the 180° peel test, between the first air-permeable support member 12 and the second porous PTFE membrane 13. The second porous PTFE membrane 13 is disposed between the pair of support members 12 and 14 and has no direct contact with a brush or water during cleaning of the filter medium 20. This is why the bond strength $A_2$ between the first air-permeable support member 12 and the second porous PTFE membrane 13 has no significant influence on the durability required for removal of dust from the surface of the filter medium 20. Thus, adjusting the bond strengths $A_1$ and $A_2$ to establish the above-mentioned relationship makes it possible to improve the durability of the filter medium 20 while avoiding a significant decrease in air permeability. That is, both high durability and high air permeability can be achieved.

In the present embodiment, the bond strength $A_1$ between the first porous PTFE membrane 11 and the first air-permeable support member 12 is desirably 1.8 N/25 mm or more. In this case, higher durability can be imparted to the filter medium 20. The bond strength $A_1$ between the first porous PTFE membrane 11 and the first air-permeable support member 12 may be 2.5 N/25 mm or less. In this case, it is possible to avoid excessively close bonding and impart sufficient air permeability to the filter medium 20. When the bond strength $A_1$ between the first porous PTFE membrane 11 and the first air-permeable support member 12 is in the range of 1.8 N/25 mm to 2.5 N/25 mm, the filter medium 20 having a good balance between the durability and air permeability can be obtained.

The bond strength $A_2$ between the first air-permeable support member 12 and the second porous PTFE membrane 13 is not particularly limited, as long as the bond strength $A_2$ is lower than the bond strength $A_1$ between the first porous PTFE membrane 11 and the first air-permeable support member 12. The upper limit of the bond strength $A_2$ is, for example, 1.6 N/25 mm. The lower limit of the bond strength $A_2$ is, for example, 0.2 N/25 mm. When the bond strength $A_2$ falls within an appropriate range, the filter medium 20 is more likely to have sufficient air permeability. The difference between the bond strength $A_1$ and the bond strength $A_2$ is not particularly limited either. In an example, the difference between the bond strength $A_1$ and the bond strength $A_2$ is in the range of 0.2 to 2.3 N/25 mm.

The above values of the bond strengths $A_1$ and $A_2$ are those measured by a 180° peel test. The 180° peel test can be conducted by the below-described methods according to Japanese Industrial Standard, JIS Z 0237.

Figure 3A:
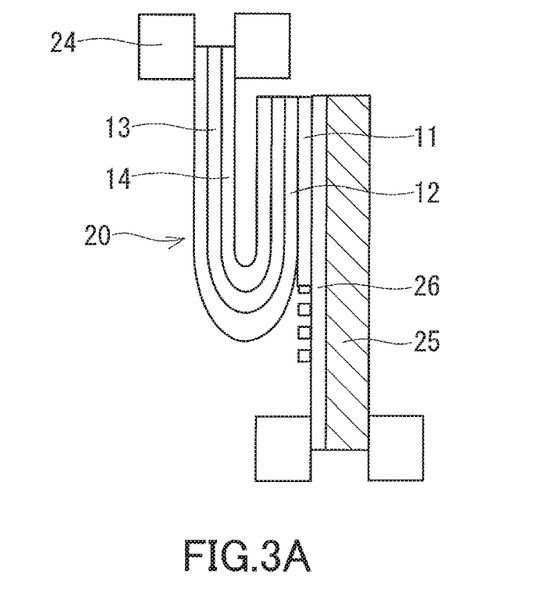
FIG. 3A is a schematic diagram illustrating a method of a 180° peel test for measuring a bond strength between a first porous PTFE membrane and a first air-permeable support member.

The method illustrated in FIG. 3A is a method for measuring the bond strength $A_1$ between the first porous PTFE membrane 11 and the first air-permeable support member 12. First, the filter medium 20 is cut into a test specimen with a size of 100 mm×25 mm. The test specimen has a length of 100 mm in the MD direction (MD: Machine Direction) of the first porous PTFE membrane 11 and a width of 25 mm in the TD direction (TD: Transverse Direction) of the first porous PTFE membrane 11. The MD and TD directions correspond to those in the production of the first porous PTFE membrane 11. A non-bonded portion where the first porous PTFE membrane 11 and the first air-permeable support member 12 are not bonded is provided beforehand at the longitudinal end of the test specimen so that peeling can occur at the interface between the first porous PTFE membrane 11 and the first air-permeable support member 12. Next, the test specimen is attached to a stainless steel plate 25 with a double-coated adhesive tape 26 (No. 500, manufactured by Nitto Denko Corporation).

The non-bonded portion of the test specimen is then secured to a chuck 24 of a tensile tester (Autograph AG-1, manufactured by Shimadzu Corporation). After that, the chuck 24 is drawn upward at a speed of 300 mm/min to cause peeling at the interface between the first porous PTFE membrane 11 and the first air-permeable support member 12, thereby measuring the 180° peel strength. Values measured initially after the start of the measurement over a length of 25 mm are ignored, and the average of the subsequently measured values (in units of N) continuously recorded for a 50-mm-long portion of the test specimen stripped off from the stainless steel plate 25 is determined as the bond strength $A_1$ of the filter medium 20.

Figure 3B:
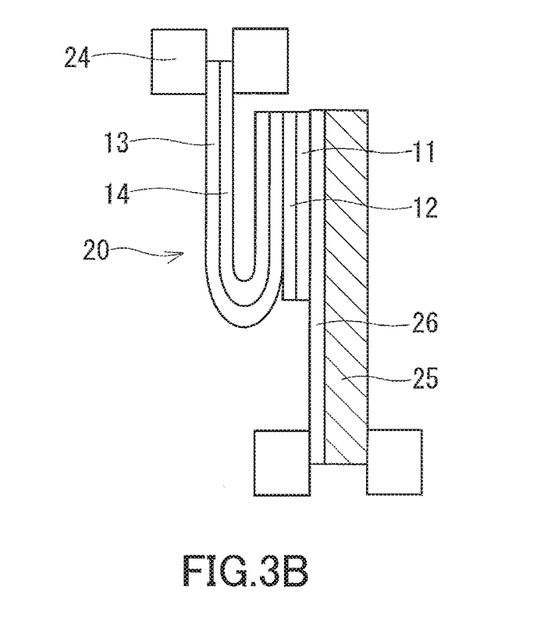
FIG. 3B is a schematic diagram illustrating a method of a 180° peel test for measuring a bond strength between a first air-permeable support member and a second porous PTFE membrane.

The method illustrated in FIG. 3B is a method for measuring the bond strength $A_2$ between the first air-permeable support member 12 and the second porous PTFE membrane 13. In this method, a non-bonded portion where the first air-permeable support member 12 and the second porous PTFE membrane 13 are not bonded is provided at the longitudinal end of the test specimen so that peeling can occur at the interface between the first air-permeable support member 12 and the second porous PTFE membrane 13. The non-bonded portion of the test specimen is secured to the chuck 24 of the tensile tester. After that, the chuck 24 is drawn upward at a speed of 300 mm/min to cause peeling at the interface between the first air-permeable support member 12 and the second porous PTFE membrane 13, thereby measuring the 180° peel strength. The average of measured values (in units of N) continuously recorded is determined as the bond strength $A_2$ of the filter medium 20. Also in the method illustrated in FIG. 3B, the test specimen has a length of 100 mm in the MD direction (MD: Machine Direction) of the second porous PTFE membrane 13 and a width of 25 mm in the TD direction (TD: Transverse Direction) of the first porous PTFE membrane 11. In general, the MD and TD directions of the second porous PTFE membrane 13 coincide with the MD and TD directions of the first porous PTFE membrane 11.

When measurement is performed by the method illustrated in FIG. 3A, cohesive failure may occur in the first porous PTFE membrane 11 without evident peeling at the interface between the first porous PTFE membrane 11 and the first air-permeable support member 12. However, the value obtained by the method described with reference to FIG. 3A is defined herein as the "bond strength $A_1$ between the first porous PTFE membrane 11 and the first air-permeable support member 12". Similarly, when measurement is performed by the method illustrated in FIG. 3B, cohesive failure may occur in the second porous PTFE membrane 13 without evident peeling at the interface between the first air-permeable support member 12 and the second porous PTFE membrane 13. The value obtained by the method described with reference to FIG. 3B is defined herein as the "bond strength $A_2$ between the first air-permeable support member 12 and the second porous PTFE membrane 13".

The pressure drop across the filter medium 20 is, for example, in the range of 50 to 400 Pa. The "pressure drop" refers to a pressure drop that occurs when air is allowed to pass through the filter medium 20 at a flow velocity of 5.3 cm/sec. Specifically, the pressure drop can be measured by the following method. That is, the filter medium 20 is set to a cylindrical holder with an effective area of 100 cm², and a pressure difference is created between the two sides of the filter medium 20 to allow air to pass through the filter medium 20. The flow velocity of the air passing through the filter medium 20 is adjusted to 5.3 cm/sec (corresponding to a flow rate of 31.8 m³/min) with the aid of a flowmeter, and then the pressure drop is measured with a pressure meter (manometer).

The filter medium 20 exhibits a collection efficiency higher than 90%, for example, for particles having a particle diameter in the range of 0.1 to 0.2 μm. Generally, a filter medium that exhibits high collection efficiency for small particles tends to have low air permeability, and it is difficult to impart both high durability and high air permeability to such a filter medium. According to the present embodiment, it is possible to impart both high durability and high air permeability to a filter medium that exhibits high collection efficiency for small particles.

The collection efficiency can be measured by the following method. That is, the filter medium 20 is set to a cylindrical holder with an effective area of 100 cm², and a pressure difference is created between the two sides of the filter medium 20 to allow gas to pass through the filter medium 20. The pressure difference is adjusted to control the liner velocity of the gas passing through the filter medium 20 to 5.3 cm/sec (corresponding to a flow rate of 31.8 m³/min). Next, polydisperse dioctyl phthalate (DOP) particles specified in JIS Z 8901 are introduced into the gas present upstream of the filter medium 20 in such a manner that the concentration of particles having particle diameters in a predetermined range is $10^6$ particles/liter. The concentration of the DOP particles present downstream of the filter medium 20 is then measured with a particle counter. The range of the diameter of the particles to be counted by the particle counter is, for example, from 0.1 to 0.2 μm. The collection efficiency can be calculated by the following equation: Collection efficiency=(1−(downstream concentration of DOP particles/upstream concentration of DOP particles))×100(%). Polyalphaolefin (PAO) may be used instead of the DOP particles.

The filter medium 20 may be a HEPA filter (High Efficiency Particulate Air Filter) or may be an ULPA filter (Ultra Low Penetration Air Filter). Both the HEPA filter and ULPA filter are filters specified in Japanese Industrial Standard, JIS Z 8122.

The filter medium 20 may be pleated into a series of W-shapes. The pleating of the filter medium 20 can be accomplished using a known pleating machine (such as a rotary pleating machine, a reciprocating pleating machine, and a striping pleating machine). In the filter medium 20 of the present embodiment, the bond strength $A_1$ between the first porous PTFE membrane 11 and the first air-permeable support member 12 is higher than the bond strength $A_2$ between the first air-permeable support member 12 and the second porous PTFE membrane 13. In this case, the stiffness of the filter medium 20 is lower than in the case where the bond strength $A_2$ is equal to the bond strength $A_1$, and thus the above pleating can more easily be carried out.

Next, a method for producing the filter medium 20 will be described.

Figure 4A:
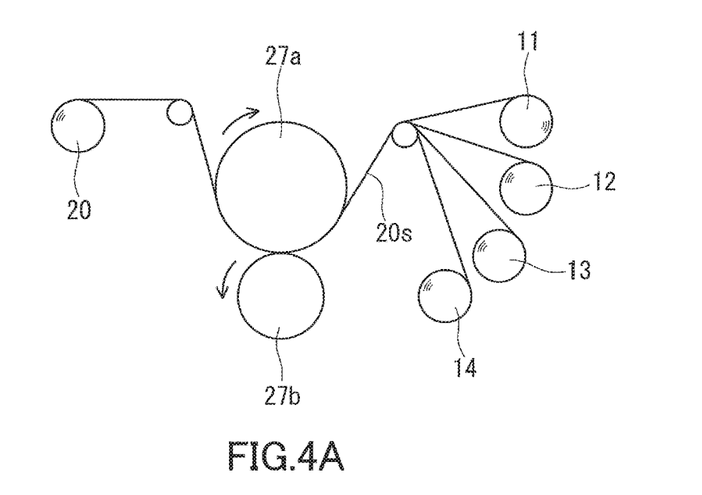
FIG. 4A is a diagram illustrating a thermal lamination process in the production of the filter medium shown in FIG. 1.

As shown in FIG. 4A, the first porous PTFE membrane 11, the first air-permeable support member 12, the second porous PTFE membrane 13, and the second air-permeable support member 14 are individually prepared on rolls. The first porous PTFE membrane 11, the first air-permeable support member 12, the second porous PTFE membrane 13, and the second air-permeable support member 14 are fed from the rolls and assembled together to form a stack 20s of the membranes and members. The stack 20s is delivered to a pair of lamination rolls 27a and 27b and passed through the gap between the lamination rolls 27a and 27b. During this passage, heat and pressure are applied to the stack 20s from the rolls 27a and 27b, and thereby the fibers constituting the air-permeable support members (non-woven fabrics) 12 and 14 are melted and solidified, so that the first porous PTFE membrane 11, the first air-permeable support member 12, the second porous PTFE membrane 13, and the second air-permeable support member 14 are bonded to one another. The filter medium 20 is thus obtained.

The pair of lamination rolls 27a and 27b is configured to apply heat and pressure to the stack 20s. In the present embodiment, the rolls 27a and 27b are configured so that the surface temperature of the roll 27a that contacts one surface of the stack 20s can be made different from the surface temperature of the roll 27b that contacts the other surface of the stack 20s. For example, only the lamination roll 27a is equipped with a heater, while the lamination roll 27b is not equipped with any heater. Typically, the lamination roll 27a is a heating roll, and the lamination roll 27b is a nip roll. As the stack 20s is passing through the gap between the lamination rolls 27a and 27b, the first porous PTFE membrane 11 contacts the lamination roll 27a and the second air-permeable support member 14 contacts the lamination roll 27b. This allows heat to be preferentially transmitted to the first porous PTFE membrane 11 and the first air-permeable support member 12. The thermal lamination of the stack 20s can thus be accomplished so that the bond strength $A_1$ between the first porous PTFE membrane 11 and the first air-permeable support member 12 will be higher than the bond strength $A_2$ between the first air-permeable support member 12 and the second porous PTFE membrane 13. It is naturally important to appropriately control the conditions such as the surface temperature of the lamination roll 27a, the pressure applied to the stack 20s, and the conveyance speed of the stack 20s.

Figure 4B:
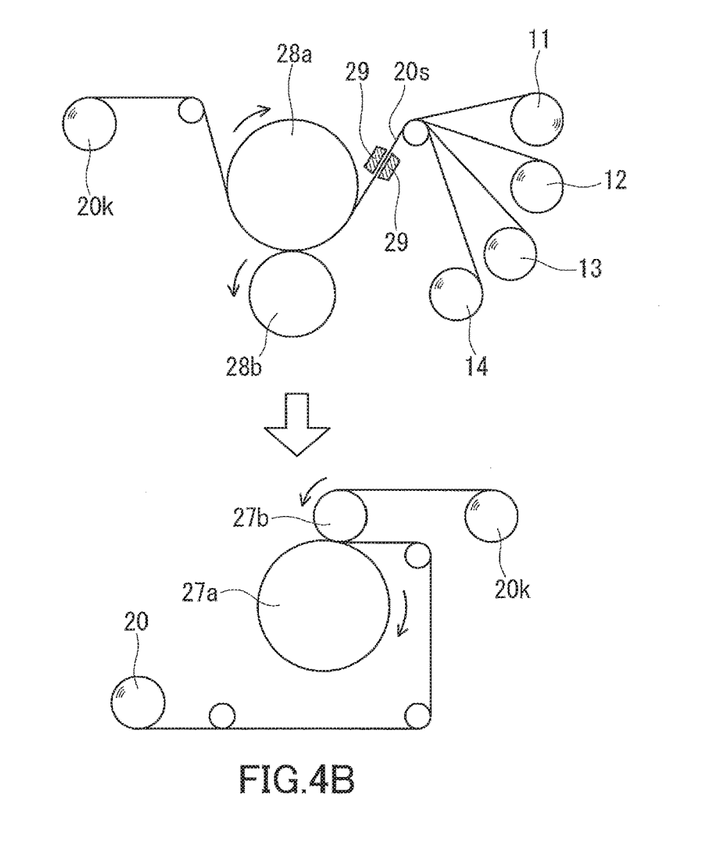
FIG. 4B is a diagram illustrating another exemplary thermal lamination process.

Alternatively, the thermal lamination process can be carried out in two stages as shown in FIG. 4B. In the first stage, which is illustrated in the upper part of FIG. 4B, the stack 20s is heated from both above and below by heaters 29 placed on the conveyance path, and is then directed to the gap between a roll 28a and a roll 28b. Typically, the roll 28a is a rotating roll, and the roll 28b is a nip roll. The heaters 29 are, for example, infrared heaters. For example, the rolls 28a and 28b have the function of applying pressure to the stack 20s but do not have the function of applying heat to the stack 20s. Thus, the first porous PTFE membrane 11, the first air-permeable support member 12, the second porous PTFE membrane 13, and the second air-permeable support member 14 are provisionally bonded through the rolls 28a and 28b, thereby giving a stack 20k. Next, in the second stage, which is illustrated in the lower part of FIG. 4B, the stack 20k is delivered to the lamination rolls 27a and 27b identical to those as described with reference to FIG. 4A. As the stack 20k is passing through the gap between the lamination rolls 27a and 27b, the lamination roll 27a for heating contacts the first porous PTFE membrane 11 of the stack 20k. The thermal lamination of the stack 20k can thus be accomplished so that the bond strength $A_1$ between the first porous PTFE membrane 11 and the first air-permeable support member 12 will be higher than the bond strength $A_2$ between the first air-permeable support member 12 and the second porous PTFE membrane 13.

In the methods described with reference to FIG. 4A and FIG. 4B, the first porous PTFE membrane 11 and the first air-permeable support member 12 may be preliminarily bonded loosely before the formation of the stack 20s. Similarly, the second porous PTFE membrane 13 and the second air-permeable support member 14 may be preliminarily bonded loosely.

Figure 5:
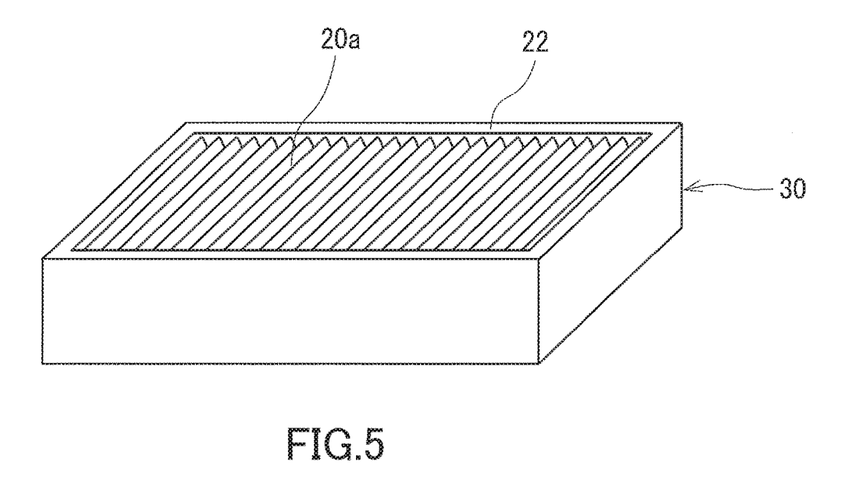
FIG. 5 is a perspective view of a filter unit including the filter medium shown in FIG. 1.

As shown in FIG. 5, a filter unit 30 includes a filter medium 20a and a support frame 22. The filter medium 20a is obtained by pleating of the filter medium 20 shown in FIG. 1. The support frame 22 supports the outer peripheral portion of the filter medium 20a. The support frame 22 is made of resin or metal. The filter medium 20a may be fixed to the support frame 22 with an adhesive. The support frame 22 may be provided with a structure for fixedly holding the outer peripheral portion of the filter medium 20a. Furthermore, the outer peripheral portion of the filter medium 20a may be buried in the support frame 22. That is, the support frame 22 and the filter medium 20a may be integrally formed by insert molding.

Next, an example of the application of the filter unit 30 will be described. The filter unit 30 can be used, for example, as an exhaust filter of a vacuum cleaner.

Figure 6:
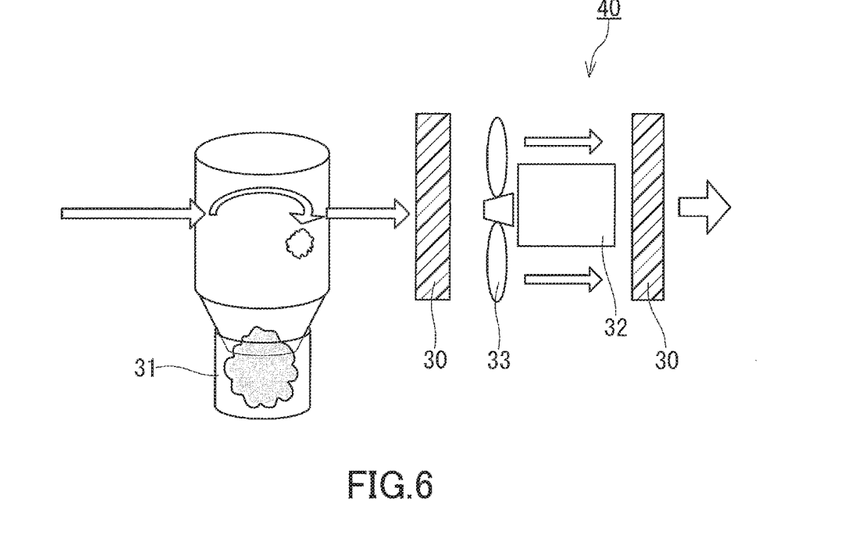
FIG. 6 is a configuration diagram of a cyclone vacuum cleaner including filter units.

In the example shown in FIG. 6, the vacuum cleaner 40 is a cyclone vacuum cleaner. However, the filter unit 30 of the present embodiment is applicable to a vacuum cleaner (such as a paper bag vacuum cleaner) other than cyclone vacuum cleaners.

The vacuum cleaner 40 includes: a mechanism 31 (a cyclone or paper bag) for separating dust from intake air; a motor 32 for rotating a fan 33; and at least one filter unit 30. In the example shown in FIG. 6, two (a plurality of) filter units 30 are provided. One of the filter units 30 is disposed between the mechanism 31 and the motor 32 in an air flow path. The other of the filter units 30 is disposed between the motor 32 and an exhaust port (not shown) in the air flow path. In each filter unit 30, the first porous PTFE membrane 11 is located most upstream in the flow direction of air and the second air-permeable support member 14 is located most downstream in the flow direction of air. Thus, dust is deposited mainly on the surface of the first porous PTFE membrane 11. One of the filter units 30 that is located more downstream serves also to collect carbon powder discharged from the motor 32. Each filter unit 30 is detachable from the vacuum cleaner 40. Dust deposited on the surface of each filter unit 30 (in particular, on the surface of the first porous PTFE membrane 11) can be removed, for example, by means of a brush, an air stream, or a water stream.

EXAMPLES

Example 1

A filter medium having the configuration described with reference to FIG. 1 was fabricated by the method described with reference to FIG. 4A. ULPA-grade porous PTFE membranes (NTF 9522-01, manufactured by Nitto Denko Corporation) were used as the first porous PTFE membrane and the second porous PTFE membrane. T-type PET/PE core-sheath non-woven fabrics (T0303WDO, double-embossed non-woven fabric manufactured by UNITIKA LTD.; melting point of sheath-forming PE=129° C., melting point of core-forming PET=261° C.) were used as the first air-permeable support member and the second air-permeable support member. The surface temperature of the lamination roll (roll 27a) for heating was 200° C. A nip roll having no heater was used as the other lamination roll (roll 27b). The conveyance speed of the stack (stack 20s) of the first porous PTFE membrane, the first air-permeable support member, the second porous PTFE membrane, and the second air-permeable support member was 5 m/min.

Example 2

A filter medium of Example 2 was fabricated in the same manner as in Example 1, except that S-type PET/PE core-sheath non-woven fabrics (S0303WDO, double-embossed non-woven fabric manufactured by UNITIKA LTD.) different in embossed area ratio from the non-woven fabrics used in Example 1 were used as the first air-permeable support member and the second air-permeable support member.

The term "embossed area ratio" as used herein to describe an embossed non-woven fabric refers to the ratio of the area of a recessed portion (portion where fibers are melted) or the total area of a plurality of recessed portions to the area of the embossed non-woven fabric. The embossed area ratio can be calculated by the following method. The surface of the non-woven fabric is observed with an electron microscope (SEM) at a given magnification (for example, a magnification of 25 times). On the basis of the obtained SEM image, the proportion of the embossed portion(s) (recessed portion(s)) is calculated. In the case of an S-type non-woven fabric (see FIG. 2B), the recessed portions are assumed to be circular. In the case of a T-type non-woven fabric (see FIG. 2A), the projecting portions (unembossed portions) are assumed to be elliptical.

Example 3

A filter medium having the configuration described with reference to FIG. 1 was fabricated by the method described with reference to FIG. 4B. ULPA-grade porous PTFE membranes (NTF 9522-01, manufactured by Nitto Denko Corporation) were used as the first porous PTFE membrane and the second porous PTFE membrane. T-type PET/PE core-sheath non-woven fabrics (T0303WDO, manufactured by UNITIKA LTD.) were used as the first air-permeable support member and the second air-permeable support member. In the first stage as illustrated in the upper part of FIG. 4B, a power supplied to the infrared heaters (heaters 29) was controlled so that the stack (stack 20s) was heated at a temperature of 150° C. In the first stage, the conveyance speed of the stack was 7 m/min. In the second stage as illustrated in the lower part of FIG. 4B, the surface temperature of the lamination roll (roll 27a) for heating was 150° C. A nip roll having no heater was used as the other lamination roll (roll 27b). In the second stage, the conveyance speed of the stack (stack 20k) of the first porous PTFE membrane, the first air-permeable support member, the second porous PTFE membrane, and the second air-permeable support member was 5 m/min.

Comparative Example 1

A filter medium of Comparative Example 1 was fabricated in the same manner as in Example 1, except that the conveyance speed of the stack (stack 20s) was changed to 1 m/min.

Comparative Example 2

A filter medium of Comparative Example 2 was fabricated in the same manner as in Example 3, except that, in the method described with reference to FIG. 4B, only the first stage (the upper part of FIG. 4B) was performed with omission of the second stage (the lower part of FIG. 4B).

Comparative Example 3

A five-layer filter medium including a first air-permeable support member, a first porous PTFE membrane, a second air-permeable support member, a second porous PTFE membrane, and a third air-permeable support member that were stacked in this order and bonded to one another was fabricated in the same manner as in Comparative Example 2. That is, a five-layer filter medium of Comparative Example 3 was fabricated in the same manner as in Example 3, except that, in the method described with reference to FIG. 4B, only the first stage (the upper part of FIG. 4B) was performed with omission of the second stage (the lower part of FIG. 4B). ULPA-grade porous PTFE membranes (NTF 9522-01, manufactured by Nitto Denko Corporation) were used as the first porous PTFE membrane and the second porous PTFE membrane. T-type PET/PE core-sheath non-woven fabrics (T0303WDO, manufactured by UNITIKA LTD.) were used as the first to third air-permeable support members. The filter medium of Comparative Example 3 corresponds to a filter medium having a configuration disclosed in FIG. 1 of Patent Literature 1.

[Pressure Drop]

The pressure drop across each of the filter media of Examples and Comparative Examples was measured by the method previously described. The results are shown in Table 1.

[Collection Efficiency]

The collection efficiency of each of the filter media of Examples and Comparative Examples was measured by the method previously described. For this collection efficiency measurement, particles having a particle diameter in the range of 0.1 to 0.2 μm (particles whose particle diameters are distributed within the above range) were used. The results are shown in Table 1.

[Durability]

Figure 7:
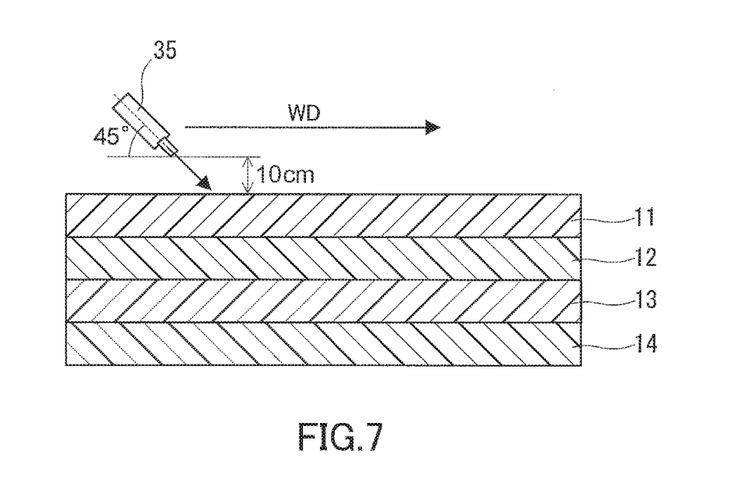
FIG. 7 is a schematic diagram illustrating a method for testing the durability of filter media.

A durability test was conducted for the filter media of Examples and Comparative Examples by the following method. First, each of the filter media of Examples and Comparative Example was cut to give a test specimen having a length of 300 mm and a width of 900 mm. As shown in FIG. 7, air with a pressure of 0.2 MPa was blown to a surface of the test specimen (the surface formed by a porous PTFE membrane) by an air gun 35 at an angle of 45 degrees from a point 10 cm away from the surface. While air was blown to the test specimen, the air gun 35 was slowly moved in the width direction WD of the test specimen for 10 seconds. After that, the test specimen was visually inspected. When pealing of the porous PTFE membrane was not observed in the test specimen, the filter medium was rated as acceptable (○), while when pealing of the porous PTFE membrane was observed in the test specimen, the filter medium was rated as unacceptable (x). The results are shown in Table 1. The width direction WD coincided with the TD direction in the production of the porous PTFE membrane.

[Ease of Cleaning]

A test for examining the ease of cleaning of the filter media of Examples and Comparative Examples was conducted by the following method. First, each of the filter media of Examples and Comparative Examples was cut to give a test specimen attachable to a circular-conical holder with an effective area of 100 cm². The test specimen was set to the holder, and 0.2 g of test powder (No. 8) specified in JIS Z 8901 was spread on the surface of the filter medium. Air was then allowed to pass through the test specimen at a linear velocity of 0.2 m/min for 1 minute. Subsequently, the surface of the test specimen was washed with running water for 5 minutes to remove the powder. This procedure was repeated five times. After that, the test specimen was visually inspected. When fouling was not clearly visible in the test specimen, the filter medium was rated as acceptable (○), while when fouling was clearly visible in the test specimen, the filter medium was rated as unacceptable (x).

Figure 9A:
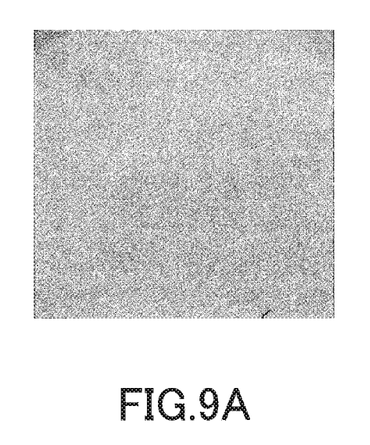
FIG. 9A is an optical photograph of a surface of a filter medium of Example 1 as observed after a test for examining the ease of cleaning.
Figure 9B:
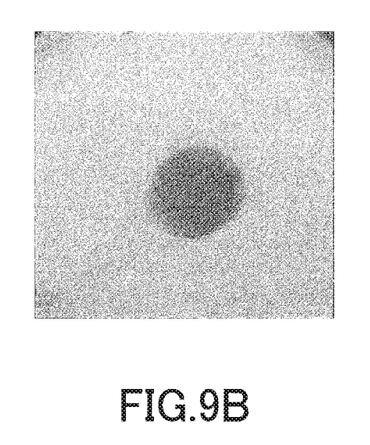
FIG. 9B is an optical photograph of a surface of a filter medium of Comparative Example 3 as observed after a test for examining the ease of cleaning.

The results are shown in Table 1, FIG. 9A, and FIG. 9B. FIG. 9A is an optical photograph of the surface of the filter medium of Example 1 as observed after the test. FIG. 9B is an optical photograph of the surface of the filter medium of Comparative Example 3 as observed after the test.

[Increase in Pressure Drop]

After the test for examining the ease of cleaning, each test specimen was thoroughly dried, and the pressure drop was then measured. The increase in pressure drop was calculated by the equation given below. The results are shown in Table 1.

$$\text{Increase in pressure drop (\%)} = 100 \times (P2-P1)/P1$$

P1: Pressure drop as measured before the test for examining the ease of cleaning P2: Pressure drop as measured after the test for examining the ease of cleaning

[Bond Strength]

Figure 8:
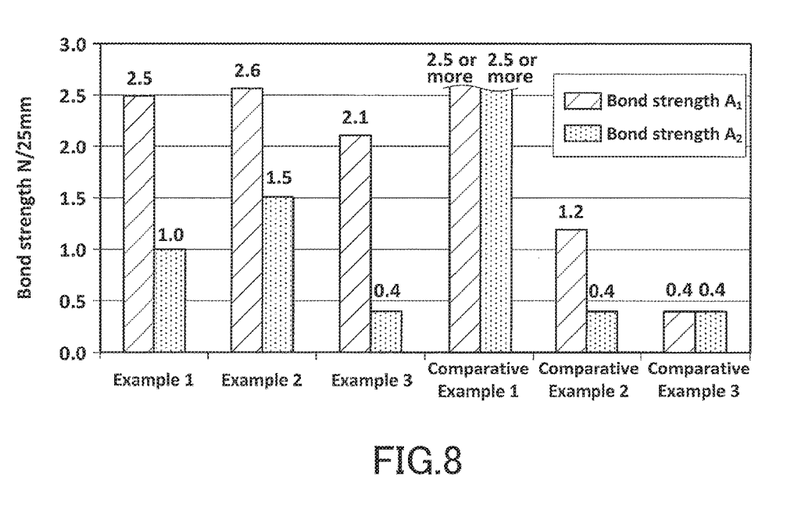
FIG. 8 is a graph showing the results of a 180° peel test.

Each of the filter media of Examples and Comparative Examples was subjected to a 180° peel test. Specifically, the bond strength $A_1$ between the first porous PTFE membrane and the first air-permeable support member (non-woven fabric) was measured by the method described with reference to FIG. 3A. The bond strength $A_2$ between the first air-permeable support member (non-woven fabric) and the second porous PTFE membrane was measured by the method described with reference to FIG. 3B. For Comparative Example 3, a bond strength between the first air-permeable support member (first layer) and the first porous PTFE membrane (second layer) was measured as the "bond strength $A_1$" according to the method described with reference to FIG. 3B, and a bond strength between the second air-permeable support member (third layer) and the second porous PTFE membrane (fourth layer) was measured as the "bond strength $A_2$" according to the method described with reference to FIG. 3B. The results are shown in Table 1 and the graph of FIG. 8.

$A_2$ being lower than the bond strength $A_1$. As can be seen from comparison among Examples 1 to 3, the pressure drop increased with increases in bond strength $A_1$ and bond strength $A_2$.

The filter medium of Comparative Example 2 satisfied the condition of (bond strength $A_1$)>(bond strength $A_2$). However, for the filter medium of Comparative Example 2, the bond strength $A_1$ was as low as 1.2 N/25 mm, so that peeling of the porous PTFE membrane was observed in the durability test.

The filter media of Example 1 (where T-type embossed non-woven fabrics were used) and Example 2 (where S-type embossed non-woven fabrics were used), which were fabricated using the same thermal lamination conditions, exhibited approximately equal values of bond strength $A_1$. As for the bond strength $A_2$, however, the bond strength $A_2$ in Example 2 was much higher than the bond strength $A_2$ in Example 1. This is believed to have resulted in the increase in pressure drop. To more reliably obtain the effect of the present invention, it is recommended that the embossed non-woven fabrics used be T-type embossed non-woven fabrics. T-type embossed non-woven fabrics also have the advantage of being able to be easily pleated.

The bond strength $A_2$ in Example 3 was approximately equal to the bond strength $A_2$ in Comparative Example 2. This suggests that the second stage (the lower part of FIG. 4B) in the method described with reference to FIG. 4B is capable of preferentially increasing the bond strength $A_1$ while causing little increase in bond strength $A_2$. That is, the method described with reference to FIG. 4B allows easy control of the bond strengths $A_1$ and $A_2$.

The surface (outermost surface) of each of the filter media of Examples 1 to 3 was formed by a porous PTFE membrane. Thus, as seen from FIG. 9A, dust was sufficiently removed by simple cleaning. By contrast, the surface of the filter medium of Comparative Example 3 was formed by an air-permeable support member (non-woven fabric). Thus, as

TABLE 1

| | Pressure drop (Pa) | Collection efficiency (%) | Durability | Ease of cleaning | Increase in pressure drop (%) | Bond strength $A_1$ (N/25 mm) | Bond strength $A_2$ (N/25 mm) |
|---|---|---|---|---|---|---|---|
| Example 1 | 280 | 99.99≤ | ○ | ○ | 0 | 2.5 | 1.0 |
| Example 2 | 370 | 99.99≤ | ○ | ○ | 0 | 2.6 | 1.5 |
| Example 3 | 220 | 99.99≤ | ○ | ○ | 0 | 2.1 | 0.4 |
| Comparative Example 1 | 1000 | 99.99≤ | ○ | ○ | 0 | 2.5≤ (Not measurable) | 2.5≤ (Not measurable) |
| Comparative Example 2 | 200 | 99.99≤ | x | Not measurable | Not measurable | 1.2 | 0.4 |
| Comparative Example 3 | 220 | 99.99≤ | Not tested | x | 6 | 0.4 | 0.4 |

As shown in Table 1, the pressure drop across the filter medium of Comparative Example 1 was considerably large. In the filter medium of Comparative Example 1, the non-bonded portion described with reference to FIG. 3A was not able to be formed due to very high bond strengths $A_1$ and $A_2$. That is why measurement of the bond strength $A_1$ and bond strength $A_2$ was not possible for the filter medium of Comparative Example 1. However, the bond strength $A_1$ and bond strength $A_2$ of the filter medium of Comparative Example 1 can be estimated to be at least 2.5 N/25 mm from the measurement results of Examples 1 and 2. For all of the filter media of Examples 1 to 3, the bond strength $A_1$ was relatively high. However, the pressure drop across the filter media of Examples 1 to 3 was small due to the bond strength seen from FIG. 9B, dust was not sufficiently removed by cleaning. The surface of the filter medium of Comparative Example 2 was formed by a porous PTFE membrane; however, the porous PTFE membrane was broken during cleaning because the bond strength $A_1$ was low. The bond strength $A_1$ of the filter medium of Comparative Example 3 was as low as 0.4 N/25 mm. However, the non-woven fabric forming the surface of the filter medium of Comparative Example 3 was not broken during cleaning.

The increase in pressure drop was 0% for all of the filter media of Examples 1 to 3. This means that, in Examples 1 to 3, the pressure drop remained unchanged before and after the test for examining the ease of cleaning. For the filter medium of Comparative Example 3, the pressure drop was increased by about 6%, compared to that measured before the test for examining the ease of cleaning.

INDUSTRIAL APPLICABILITY

The technique disclosed herein is applicable to various filters such as intake air filters for turbines, air filters for clean rooms, and filters for household electric appliances. The technique disclosed herein particularly contributes to improvement of vacuum-cleaner filters which may be frequently cleaned.

The invention claimed is:

1. A filter medium comprising a first porous polytetrafluoroethylene membrane, a first air-permeable support member, a second porous polytetrafluoroethylene membrane, and a second air-permeable support member that are stacked in this order and bonded to one another, wherein
   a surface of the filter medium is formed by the first porous polytetrafluoroethylene membrane, and
   a bond strength, as measured by a 180° peel test, between the first porous polytetrafluoroethylene membrane and the first air-permeable support member is higher than 1.2 N/25 mm and higher than a bond strength, as measured by the 180° peel test, between the first air-permeable support member and the second porous polytetrafluoroethylene membrane.

2. The filter medium according to claim 1, wherein the bond strength between the first porous polytetrafluoroethylene membrane and the first air-permeable support member is 1.8 N/25 mm or more.

3. The filter medium according to claim 1, wherein the bond strength between the first porous polytetrafluoroethylene membrane and the first air-permeable support member is 2.5 N/25 mm or less.

4. The filter medium according to claim 1, wherein
   the first air-permeable support member and the second air-permeable support member are each a non-woven fabric, and
   the non-woven fabric is an embossed non-woven fabric.

5. The filter medium according to claim 1, wherein
   the first air-permeable support member and the second air-permeable support member are each a non-woven fabric, and
   the non-woven fabric is an embossed non-woven fabric that has a sea-island structure when viewed in plan, and
   in the embossed non-woven fabric, a portion corresponding to the sea is a recessed portion, and a portion corresponding to an island is a projecting portion.

6. The filter medium according to claim 1, wherein a collection efficiency for particles having a particle diameter in a range of 0.1 to 0.2 μm is higher than 90%.

7. The filter medium according to claim 1, wherein the filter medium is pleated.

8. A filter unit comprising:
   the filter medium according to claim 1; and
   a support frame supporting an outer peripheral portion of the filter medium.

\* \* \* \* \*